US009692546B2

(12) United States Patent
Lam et al.

(10) Patent No.: US 9,692,546 B2
(45) Date of Patent: Jun. 27, 2017

(54) INCREASING THE CAPACITY OF A WDM-PON WITH WAVELENGTH REUSE

(71) Applicant: Google Inc., Mountain View, CA (US)

(72) Inventors: Cedric Fung Lam, Belmont, CA (US); Yut Loy Chan, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/885,060

(22) Filed: Oct. 16, 2015

(65) Prior Publication Data

US 2016/0036551 A1 Feb. 4, 2016

Related U.S. Application Data

(62) Division of application No. 13/793,206, filed on Mar. 11, 2013, now Pat. No. 9,197,352.

(51) Int. Cl.
*H04J 14/02* (2006.01)
*H04B 10/20* (2006.01)
*H04Q 11/00* (2006.01)

(52) U.S. Cl.
CPC ........ *H04J 14/0242* (2013.01); *H04J 14/025* (2013.01); *H04J 14/0246* (2013.01); *H04J 14/0265* (2013.01); *H04J 14/0282* (2013.01); *H04Q 11/0067* (2013.01); *H04J 2014/0253* (2013.01); *H04Q 2011/0016* (2013.01); *H04Q 2011/0086* (2013.01)

(58) Field of Classification Search
None
See application file for complete search history.

(56) References Cited

U.S. PATENT DOCUMENTS 7,221,820 B2 * 5/2007 Boertjes ............. H04B 10/2513
385/24
8,280,253 B2 * 10/2012 Genay ................. G01M 11/319
356/73.1

(Continued)

FOREIGN PATENT DOCUMENTS

CN 101355820 A 1/2009
CN 101557540 A 10/2009

(Continued)

OTHER PUBLICATIONS

International Search Report and Written Opinion for related Application No. PCT/US2014/015270 dated Dec. 2, 2014.

(Continued)

*Primary Examiner* — Oommen Jacob
(74) *Attorney, Agent, or Firm* — Honigman Miller Schwartz and Cohn LLP (57) ABSTRACT

A method of processing optical signals in a passive optical network includes receiving a first signal in a first optical spectrum, and receiving a second signal in a second optical spectrum. The second optical spectrum is different from the first optical spectrum. The method also includes multiplexing the first and second signals into a first multiplexed signal and outputting the first multiplexed signal. The method also includes receiving a second multiplexed signal, and demultiplexing the second multiplexed signal into a third signal and a fourth signal. The third signal is in the second optical spectrum and the fourth signal is in the first optical spectrum. The method also includes outputting the third and fourth signals.

12 Claims, 10 Drawing Sheets

(56) References Cited

U.S. PATENT DOCUMENTS

| | | | | |
|---|---|---|---|---|
| 8,320,760 | B1* | 11/2012 | Lam | H04J 14/002 398/66 |
| 8,428,460 | B2* | 4/2013 | Lee | H04J 14/0226 398/100 |
| 8,447,182 | B2* | 5/2013 | Bouda | H04J 14/0221 398/68 |
| 8,855,492 | B2* | 10/2014 | Hood | H04J 14/0234 398/66 |
| 2003/0081285 | A1* | 5/2003 | Shimojoh | H04B 10/2918 398/79 |
| 2004/0136716 | A1* | 7/2004 | Jung | H04B 10/506 398/85 |
| 2004/0151426 | A1* | 8/2004 | Boertjes | H04B 10/2513 385/24 |
| 2005/0259988 | A1 | 11/2005 | Jung et al. | |
| 2006/0120664 | A1 | 6/2006 | Lee et al. | |
| 2008/0131125 | A1 | 6/2008 | Byoung Whi et al. | |
| 2009/0010649 | A1 | 1/2009 | Zuhdi et al. | |
| 2009/0052906 | A1 | 2/2009 | Pincemin et al. | |
| 2010/0129077 | A1* | 5/2010 | Bainbridge | H04J 14/0265 398/79 |
| 2010/0142955 | A1* | 6/2010 | Yu | H04B 10/25754 398/72 |
| 2011/0020001 | A1* | 1/2011 | Kim | H04J 14/0282 398/63 |
| 2011/0158650 | A1* | 6/2011 | Cavaliere | H04J 14/0226 398/79 |
| 2011/0222855 | A1* | 9/2011 | Kim | H04J 14/0282 398/79 |
| 2011/0293279 | A1* | 12/2011 | Lam | H04J 14/0279 398/79 |
| 2012/0106965 | A1 | 5/2012 | Lee et al. | |
| 2012/0269515 | A1* | 10/2012 | Cvijetic | H04B 10/2507 398/72 |
| 2012/0269516 | A1* | 10/2012 | Liu | H04B 10/2503 398/72 |
| 2013/0089319 | A1* | 4/2013 | Grobe | H04J 14/0227 398/7 |
| 2014/0029951 | A1* | 1/2014 | Handelman | H04J 14/02 398/91 |
| 2014/0161455 | A1* | 6/2014 | Ho | H04B 10/40 398/70 |
| 2014/0255033 | A1* | 9/2014 | Lam | H04J 14/0242 398/79 |
| 2016/0036551 | A1* | 2/2016 | Lam | H04J 14/0242 398/49 |

FOREIGN PATENT DOCUMENTS

| | | |
|---|---|---|
| EP | 2518912 A1 | 10/2012 |
| EP | 2525517 A1 | 11/2012 |
| KR | 20050067873 A | 7/2005 |
| KR | 20070013539 A | 1/2007 |
| WO | WO-2009078572 A1 | 6/2009 |

OTHER PUBLICATIONS

Xinzhu Wang et al: "A novel highly reliable WDM-PON system", Asia Communications and Photonics Conference and Exhibition, Nov. 2, 2009, pp. 1-10.

European Extended Search Report fo the related Application No. 14778202.3 dated Sep. 2, 2016.

* cited by examiner

INCREASING THE CAPACITY OF A WDM-PON WITH WAVELENGTH REUSE

CROSS REFERENCE TO RELATED APPLICATIONS

This U.S. patent application is a divisional of, and claims priority under 35 U.S.C. §121 from, U.S. patent application Ser. No. 13/793,206, filed on Mar. 11, 2013, which is hereby incorporated by reference in its entirety.

TECHNICAL FIELD

This disclosure relates to increasing the capacity of a WDM-PON with wavelength reuse.

BACKGROUND

Fiber to the home (FTTH) is regarded as the end state of broadband wireline access networks as fiber offers virtually unlimited bandwidth. FTTH replaces currently used copper infrastructure (e.g., telephone wires, coaxial cable, etc.). Multiplexing is a method used in optical networks to utilize the large bandwidth of optics to their full extent. Multiplexing enable several virtual channels to be formed on a single fiber. Therefore, multiplexing several optic signals increases the connectivity and utilization of a network. Time division multiplexing (TDM) is a method used to multiplex several signals onto one fiber optic link. TDM multiplexes several signals by establishing different virtual channels using different time slots. Wavelength division multiplexing (WDM) multiplexes the signals by having different virtual channels using different wavelengths.

WDM systems include a multiplexer and a demultiplexer. The WDM multiplexer combines signals of different wavelengths at the transmission side, and the WDM demultiplexer separates signals of different wavelength s at the receiver side. Optical signal multiplexers and demultiplexers are mostly reciprocal devices which can be used to combine and separate signals depending on the input direction of the signals.

SUMMARY

Typically, in a WDM-PON system, one spectrum is used for upstream communications and another spectrum is used for downstream communications. The disclosure provides a method and system for doubling the capacity of a WDM-PON system by using the upstream and downstream wavelengths for both transmitting and receiving signals. In other words, a first spectrum once used for only upstream communications is now used for both upstream and downstream communications.

One aspect of the disclosure provides a method of processing optical signals in a passive optical network. The method includes receiving a first signal in a first optical spectrum and receiving a second signal in a second optical spectrum. The second optical spectrum is different from the first optical spectrum. The method also includes multiplexing the first and second signals into a first multiplexed signal and outputting the first multiplexed signal. The method includes receiving a second multiplexed signal and demultiplexing the second multiplexed signal into a third signal and a fourth signal. The third signal is in the second optical spectrum and the fourth signal is in the first optical. The method includes outputting the third and fourth signals. Each signal may include multiple wavelengths.

Implementations of the disclosure may include one or more of the following features. In some implementations, the method includes separating the first and fourth signals travelling in opposite directions in the first optical spectrum, and separating the second and third signals travelling in opposite directions in the second optical spectrum. Additionally, the method may include routing the first signal and the fourth signal through a first optical circulator and routing the second signal and the third signal through a second optical circulator.

In some implementations, the method includes receiving the first signal from a first optical component and outputting the fourth signal to a second optical component. Additionally or alternatively, the method may include receiving the second signal from the second optical component and outputting the third signal to the first optical component. In some examples, at least one of the optical components includes a transceiver or a multiplexer.

In some implementations, the method includes receiving the first signal from a first sub-band multiplexer and outputting the third signal to a second sub-band multiplexer. The method may also include receiving the second signal from a third sub-band multiplexer and outputting the fourth signal to a fourth sub-band multiplexer. In some examples, the method includes receiving sub-band signals of the first signal from a first group of transceivers in communication with the first sub-band multiplexer and outputting sub-band signals of the third signal to the first group of transceivers through the second sub-band multiplexer. Additionally, the method may include receiving sub-band signals of the second signal from a second group of transceivers in communication with the third sub-band multiplexer, outputting sub-band signals of the fourth signal to the second group of transceivers through the fourth sub-band multiplexer.

The method may include routing the first and second signals to a multiplexer for multiplexing the first and second signals into the first multiplexed signal. In some examples, the method includes routing the second multiplexed signal to the multiplexer for demultiplexing the second multiplexed signal into the third and fourth signals.

In some implementations, the method includes receiving the first signal from a first multiplexer, which demultiplexes a received third multiplexed signal into the first and third signals. Additionally, the method includes receiving the second signal from a second multiplexer, which demultiplexes a received fourth multiplexed signal into the second and fourth signals. The method may output the third signal from the first multiplexer and the fourth signal from the second multiplexer. The first and second multiplexers may receive the corresponding third and fourth multiplexed signals from corresponding arrayed waveguide gratings.

Another aspect of the disclosure provides a method of processing optical signals in a passive optical network. The method includes receiving first and fifth sub-band signals in a first optical spectrum and receiving second and sixth sub-band signals in a second optical spectrum, which is different from the first optical spectrum. The method includes multiplexing the first and fifth sub-band signals into a first multiplexed sub-band signal in the first spectrum and multiplexing the second and sixth sub-band signals into a second multiplexed sub-band signal in the second spectrum. The method also includes multiplexing the first and second multiplexed sub-band signals into a first combined multiplexed signal and outputting the first combined multiplexed signal. The method also includes receiving a second combined multiplexed signal and demultiplexing the second combined multiplexed signal into third and fourth multiplexed sub-band signals. Additionally, the method includes demultiplexing the third multiplexed sub-band signal into fourth and eighth sub-band signals in the first optical spectrum and demultiplexing the fourth multiplexed sub-band signal into third and seventh sub-band signals in the second optical spectrum. The method includes outputting the third, fourth, fifth and seventh sub-band signals. The method may include multiplexing/demultiplexing many (e.g., more than two) sub-bands of signals.

In some implementations, the method further includes separating the first and fourth signals travelling in opposite directions in the first optical spectrum and separating the second and third signals travelling in opposite directions in the second optical spectrum. Additionally, the method may include separating the fifth and eighth signals travelling in opposite directions in the first optical spectrum and separating sixth and seventh signals travelling in opposite directions in the second optical spectrum. In some examples, the method further includes routing the first signal and the fourth signal through a first optical circulator and routing the second signal and the third signal through a second optical circulator. The method may include routing the fifth signal and the eighth signal through a third optical circulator, and routing the sixth signal and the seventh signal through a fourth optical circulator.

The method may include receiving the first signal from a first optical component and outputting the fourth signal to a second optical component. Additionally, the method may include receiving the second signal from the second optical component and outputting the third signal to the first optical component. In some examples, the method includes receiving the fifth signal from a third optical component and outputting the eighth signal to a fourth optical component. The method may also include receiving the sixth signal from the fourth optical component and outputting the seventh signal to the third optical component. The at least one of the optical components may include a transceiver array or a multiplexer. The method may include multiplexing/demultiplexing many (e.g., more than two) sub-bands of signals.

Another aspect of the disclosure provides a bidirectional optical communication device. The communication device includes first and second optical circulators and a multiplexer. The first optical circulator separates first and fourth signals travelling in opposite directions in a first optical spectrum. The second optical circulator separates second and third signals travelling in opposite directions in a second optical spectrum that is different from the first optical spectrum. The multiplexer is in optical communication with the first and second optical circulators and multiplexes/demultiplexes between a multiplexed signal and signals of the first and second spectrums.

In some implementations, the first optical circulator receives the first signal from a first optical component and outputs the fourth signal to a second optical component. Additionally or alternately, the second optical circulator may receive the second signal from the second optical component and may output the third signal to the first optical component. In some examples, one of the optical components includes a transceiver array or a multiplexer.

In yet another aspect of the disclosure, a bidirectional optical communication device includes first, second, third, and fourth optical circulators and first, second, and third multiplexers. The first optical circulator separates first and fourth sub-band signals travelling in opposite directions in a first optical spectrum. The second optical circulator separates second and third sub-band signals travelling in opposite directions in a second optical spectrum that is different from the first optical spectrum. The third optical circulator separates fifth and eighth sub-band signals travelling in opposite directions in the first optical spectrum. The fourth optical circulator separates sixth and seventh sub-band signals travelling in opposite directions in the second optical spectrum. Additionally, the first multiplexer is in optical communication with the first optical circulator and multiplexes/demultiplexes between a first spectrum multiplexed sub-band signal and the first spectrum sub-band signals. The second multiplexer is in optical communication with the second optical circulator and multiplexes/demultiplexes between a second spectrum multiplexed sub-band signal and the second spectrum sub-band signals. Moreover, the third multiplexer is in optical communication with the first and second multiplexers. The third multiplexer multiplexes/demultiplexes between the multiplexed sub-band signals and a multi-spectrum multiplexed signal. Although examples may be described with multiplexing/demultiplexing two sub-bands of signals, more than two sub-bands are possible as well. For example, a sub-band multiplexer accommodating three sub-bands of signals can be expanded with six optical circulators, thus doubling the capacity.

In some implementations, the first optical circulator receives the first signal from a first optical component and outputs the fourth signal to a second optical component. The second optical circulator may receive the second signal from the second optical component and may output the third signal to the first optical component. In some examples, the third optical circulator receives the fifth signal from a third optical component and outputs the eighth signal to a fourth optical component. Additionally, the fourth optical circulator may receive the sixth signal from the fourth optical component and may output the seventh signal to the third optical component. One of the optical components may include a transceiver array or a multiplexer.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
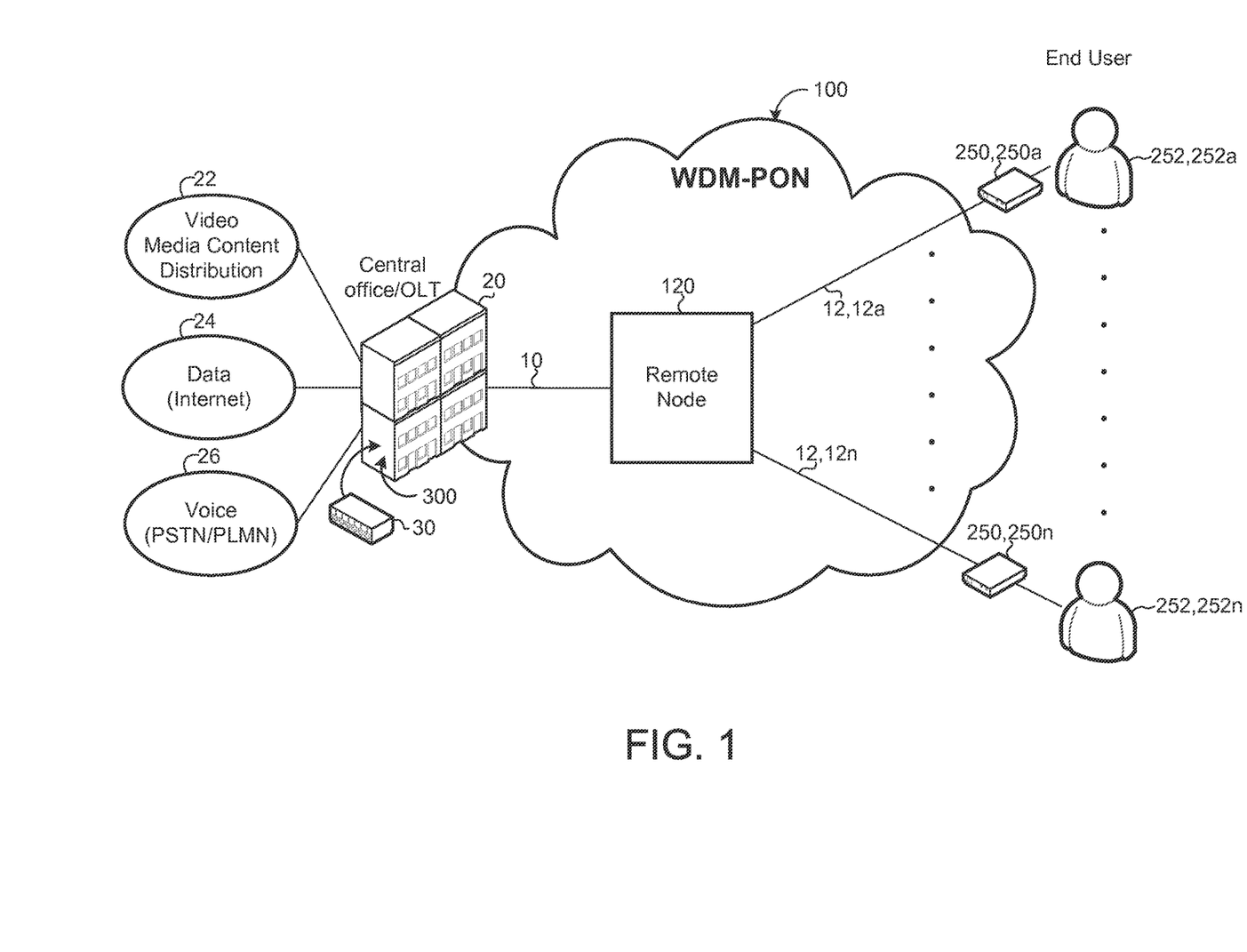
FIG. 1 is a schematic view of an exemplary WDM-PON network using an exemplary bidirectional optical communication device.

Fiber-to-the-home (FTTH) is the delivery of a communication signal through optical fibers from a central office (CO) or optical line terminal (OLT) to a home or a business of a user. Referring to FIG. 1, a passive optical networks (PON) 100 is a point-to-multipoint network architecture that uses an optical remote node 120 to enable a single optical fiber feeder 10 to serve multiple users 252a-252n (e.g. 16-128). The PON 100 provides optical signals from a CO 20 and includes an optical transmitter/receiver or transceiver 30 to a number of optical network terminals (ONUs) 250 that each includes an optical transmitter/receiver. In some examples, the PON 100 includes multiple optical transmitter/receiver or transceiver systems 30. One feeder fiber 10 is sent from the CO 20 to a remote node 120, where the signal is split and distributed to many (e.g., 32) different optical network units 250a-250n via fiber feeders 12a-12n.

A time division multiplexed PON (TDM-PON) provides beneficial savings in the number of feeder fibers 10 between a remote node 120 and the central office 20, and in the number of optical transceiver system counts at the CO 20, while saving patch panel space to terminate fibers. However, TDM-PON does not scale well with bandwidth growth. The bandwidth per household is often oversubscribed since the bandwidth per optical line terminal transceiver at the central office 20 is shared among all ONUs 250 that are connected to an OLT 30.

Point-to-point (Pt-2-pt) systems provide the ultimate high bandwidth to end users 252; however, pt-2-pt systems use a great number of feeder fibers 10 and optical transceiver systems 30. Thus, pt-2pt systems do not scale well with OLTs 30 at the central office 20 and the fiber count between the CO 20 and the remote node 120, resulting in greater space requirements, higher power, and an increase in cost.

Referring to FIG. 1, in some implementations, a WDM-PON system 100 provides CO fiber termination consolidation that a TDM-PON system offers, bandwidth scalability similar to pt-2-pt home-run fiber systems and the easy-to-understand end-to-end protocol transparency. WDM-PON offers every broadband subscriber 252 a separate wavelength, while providing the benefits of both TDM-PON and pt-2-pt architectures. A WDM-PON network uses a wavelength demultiplexer as opposed to the power splitter used in TDM-PONs to distribute optical signals to end-users 252 through an access loop fiber 12a-12n. The capacity of a WDM-PON network is limited by the number of wavelengths available in a system.

The central office (CO) 20 receives information such as video media distribution 22, internet data 24, and voice data 26 that may be transferred to the end users 252. The CO 20 includes an optical line terminal 20 (OLT) connecting the optical access network to an IP, ATM, or SONET backbone, for example. Therefore, the OLT 20 device is the endpoint of the PON 100 and converts the electrical signals used by a service provider's equipment and the fiber optic signals used by the PON 100. In addition, OLT 30 coordinates multiplexing between the conversion devices at the user end 252. The OLT 30 sends the fiber optic signal through a feeder fiber 10, and the signal is received by a remote node 120, which demultiplexes the signal and distributes it to multiple users 252.

Generally, a multiplexer (MUX) combines several input signals and outputs a combined signal of the separate signals. The multiplexed signal is transmitted through a physical wire which saves the cost of having multiple wires for each signal. As shown in FIG. 1, the CO 20 multiplexes the signals received from several sources, such as video media distribution 22, internet data 24, and voice data 26, and multiplexes the received signals into one multiplexed signal before sending the multiplexed signal to the remote node 120 through the feeder fiber 10. On the receiver end, a reverse process occurs using a demultiplexer (DEMUX). The demultiplexer receives the multiplexed signal and divides it into the separate original signals that were originally combined. When the received signal is demultiplexed, the demultiplexed signals are transmitted through the optical fibers 12a-12n to the multiple end users 252.

Figure 2A:
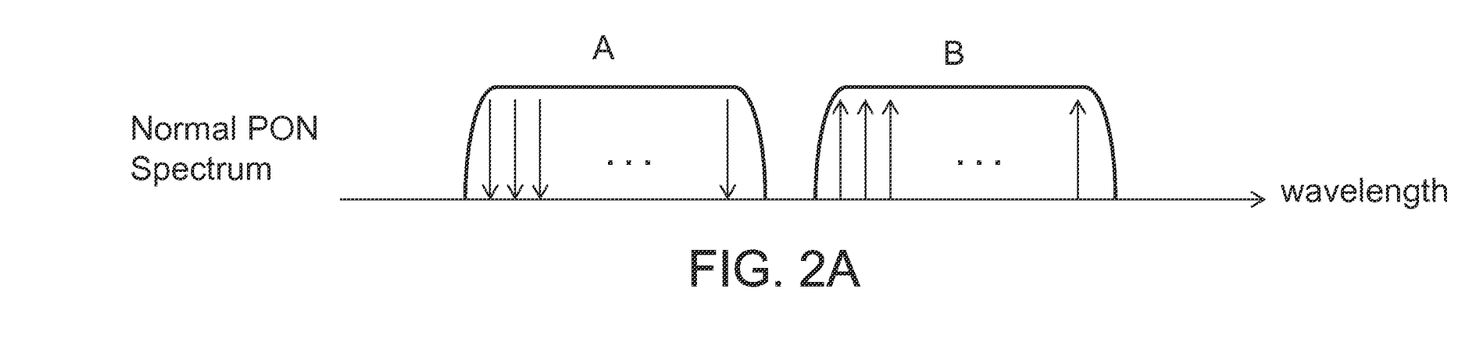
FIGS. 2A and 2B are schematic views of the signals in normal PON spectrums and inverse PON spectrum.
Figure 2B:
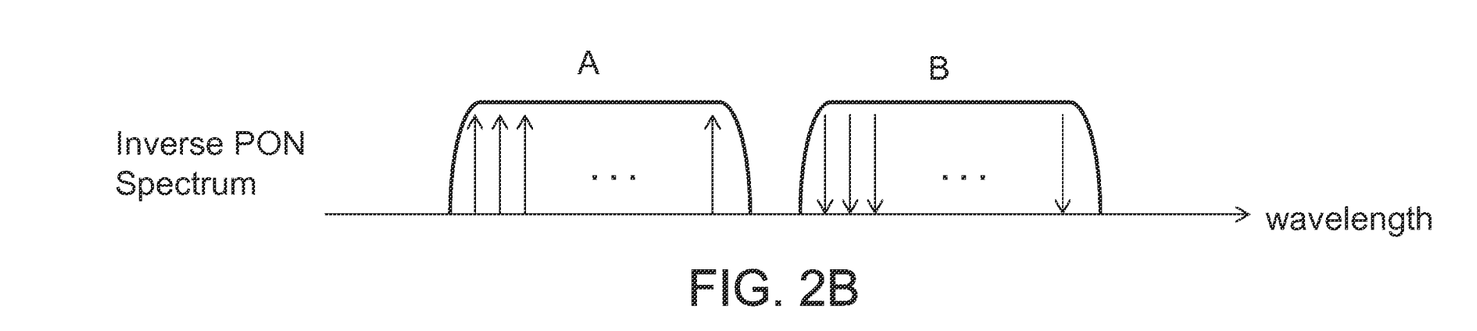

Referring also to FIGS. 2A and 2B, usually, in a WDM-PON system, the upstream and downstream wavelengths are separated. In FIG. 2A, in a normal PON, a first spectrum A is used for downstream communications from the CO 20 to the end user 252, and a second spectrum B is used for upstream communications from the end user 252 to the CO 20. However, the capacity for the WDM-PON system may be doubled by using the upstream and downstream wavelengths for both transmitting and receiving signals. The first spectrum A, previously used for only downstream communications, may be used for both upstream and downstream communications. In addition, the second spectrum B, previously used for upstream only, may now be used for both upstream and downstream. The system 100 re-uses the same wavelengths for both the upstream and downstream transmissions resulting in doubling the number of users 152 on the WDM-PON network 100 without doubling the spectrum or number of feeder fibers needed to be terminated in the CO. The re-using of the wavelengths for both upstream and downstream transmission also avoids decreasing the spacing between the wavelengths to increase the number of wavelengths per spectrum in order to increase the number of users 252.

Figure 3A:
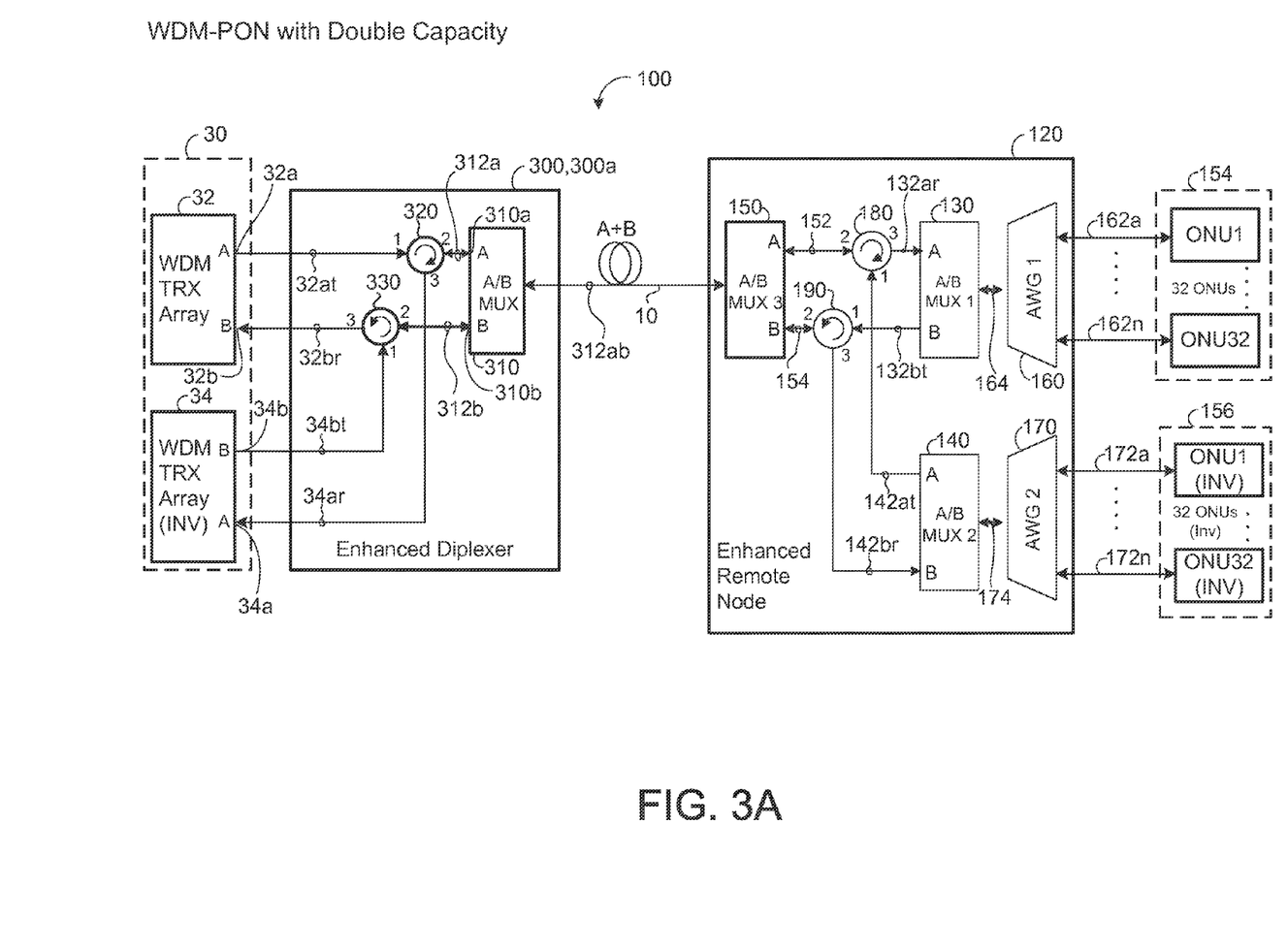
FIG. 3A is a schematic view of a WDM-PON network using an exemplary bi-directional optical communication device.
Figure 3B:
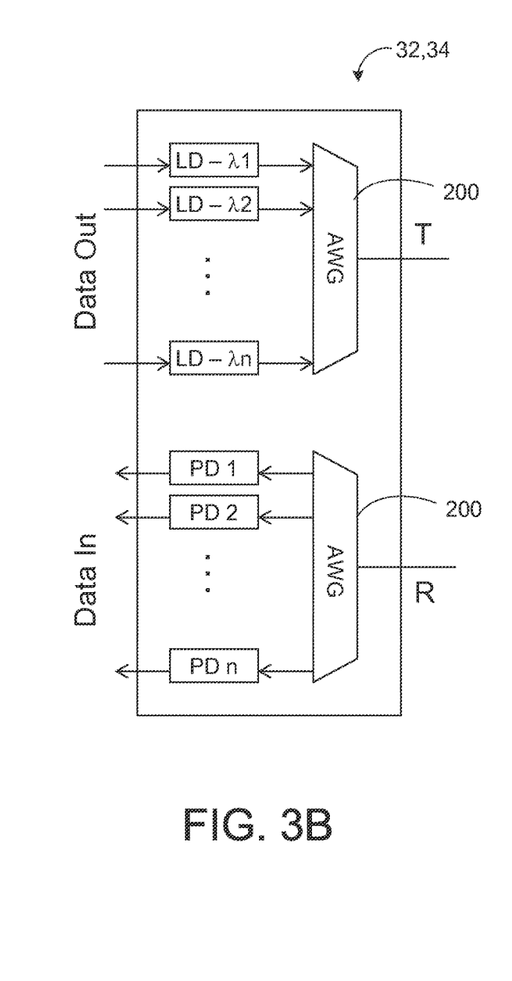
FIG. 3B is a schematic view of an exemplary transceiver array.

Referring to FIGS. 3A-3E, in some implementations, the WDM-PON system 100 includes an enhanced diplexer 300, e.g., at the CO 20, and an enhanced remote node 120. The system 100 includes a transceiver system 30 for transmitting and receiving a signal 32at, 32br, 34bt, 34ar. The transceiver 30 has a transceiver array 32 and an inverse transceiver array 34 at the CO 20 side. An exemplary transceiver array 32, 34 is shown in FIG. 3B. The transceiver array 32 transmits a signal 32at in optical spectrum A, and receives a signal 32br in optical spectrum B. The inverse transceiver array 34 transmits a signal 34bt using the optical spectrum B, and receives a signal 34ar in optical spectrum A. Spectrum A and spectrum B are different from one another. Therefore, the inverse transceiver array 34 uses the same optical spectra used by the transceiver array 32; except that, the inverse array transceiver 34 reverses the use of the spectra with respect to the received 32br, 34ar and transmitted signals 32at, 34bt.

In some implementations, the enhanced diplexer 300a includes a multiplexer 310 and first and second circulators 320, 330. A circulator 320, 330 is a component used in fiber optics systems to separate optical signals travelling in opposite directions. A circulator 320, 330 has non-reciprocal properties allowing the properties of light passing in one direction to remain the same when another light signal passes in the opposite direction. The optical path of a signal depends on the propagation direction as opposed to wavelength only, allowing the re-use of the same wavelength for upstream and downstream transmissions. The optical circulators 320, 330 usually include three ports 1, 2, 3 designed in such a way that a signal entering any port outputs the next port. For example, in an optical circulator 320,330 having a first port 1, a second port 2, and a third port 3, if an optical signal enters port 1, the optical signal will exit port 2. Similarly, if an optical signal enters port 2, it is outputted from port 3. Optical circulators 320, 330 allow receiving and transmitting data through the same fibers 10. In some examples, an optical circulator 320, 330 includes a first port 1 connected to a transceiver 32, 34 for transmitting a signal 32at, 34at. A second port 2 of the circulator 320, 330 is connected to a multiplexer 310 that multiplexes transmitted signals 32at, 34bt, and received signals 32ar, 34br into one signal 312ab onto one feeder fiber 10. Therefore, the second port 2 is a bi-directional port allowing opposite directions signals to pass through. The third port 3 outputs the received signal 32br, 34ar from the multiplexer 310.

In some implementations, at the CO 20, a transceiver array 32 is connected to an enhanced diplexer 300a. The transceiver array 32 has transmitting port 32a connected to a first port 1 of a first circulator 320 to transmit a first signal 32at. The first circulator 320 routes the received signal 32at to its second port 2. The second port 2 of the first circulator 320 connects to a first bi-directional port 310a of a multiplexer 310 (e.g., for spectrum A). The transceiver array 32 also has a receiving port 32b connected to a third port 3 of a second circulator 330 to receive a third signal 32br. The second circulator 330 has its second port 2 connected to a second bi-directional port 310b of the multiplexer 310 (e.g., for spectrum B) to circulate the signal 32br to the transceiver array 32. Similarly, the inverse transceiver array 34 has a transmitting port 34b connected to the first port 1 of the second circulator 330 to transmit a second signal 34bt. The inverse transceiver array 34 has a receiving port 34a connected to the third port 3 of the first circulator 320 to circulate a fourth signal 34ar received by the multiplexer 310. As previously noted, the transceiver array 32 uses spectrum A to transmit a signal 32at and spectrum B to receive a signal 32br, while the inverse transceiver array 34 receives a signal 32ar in spectrum A and transmits a signal 34at in spectrum B. The multiplexer 310 multiplexes/demultiplexes received signals 32at, 34bt in both spectrums and transmitted signals 32br, 34br in both spectrums A, B. For example, the signal 312ab may contain multiplexed signals 32at, 34bt transmitting from the multiplexer 310 to the remote node 120 and multiplexed signals 32br, 34br transmitting from the remote node 120 to the multiplexer 310. The multiplexer 310 may therefore multiplex signals 32at,34bt and demultiplex signals 32br, 34br, 310, as the multiplexed signal 312ab transmitted over the feeder fiber 10 between the remote node 120 and the enhanced diplexer 300a may be a bidirectional multiplexed signal covering both spectrum A and B.

Figure 3C:
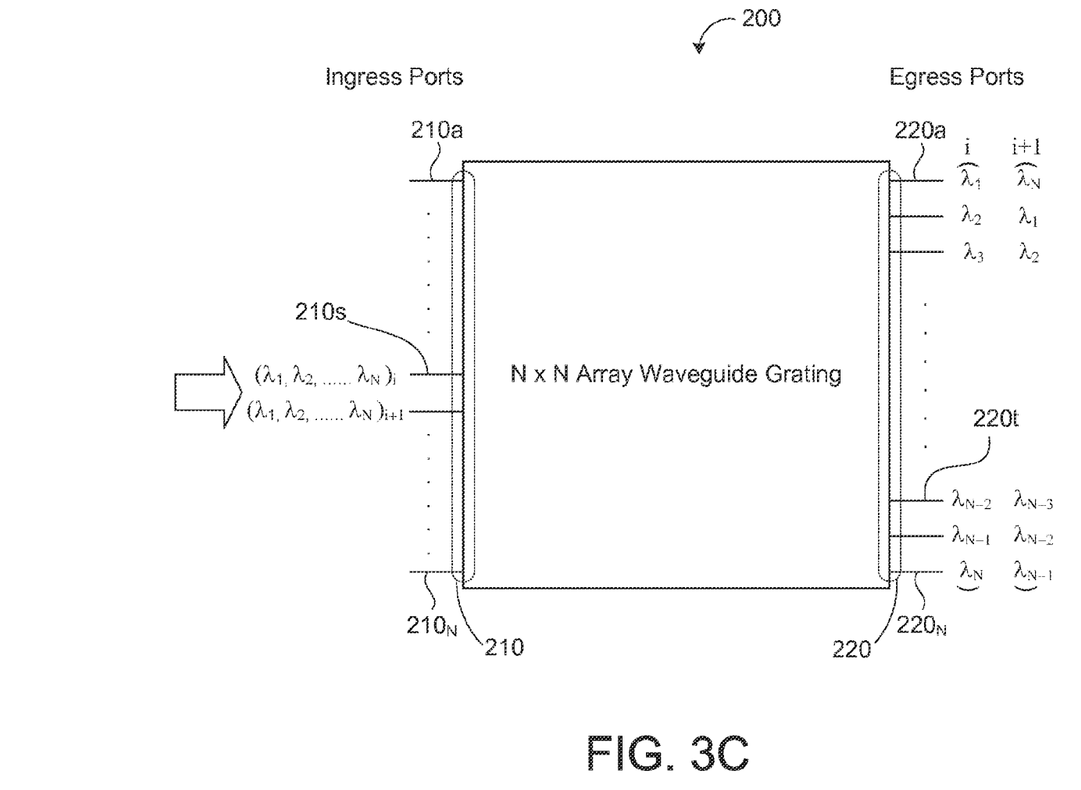
FIG. 3C is a schematic view of an exemplary arrayed waveguide grating (AWG).

In some examples, the enhanced remote node 120 includes two arrayed waveguide gratings (AWG) 160, 170. Referring to FIG. 3C, an AWG 200 is commonly used to demultiplex an optical signal in a wavelength division multiplexed system. AWGs 200 can multiplex a large number of wavelengths into one optical fiber, thus increasing the transmission capacity of optical networks. AWGs 200 can therefore multiplex channels of several wavelengths $\lambda$ through $\lambda_N$ onto a single optical fiber at a transmission end, and can also demultiplex one single optical link having different wavelengths $\lambda_1$ through $\lambda_N$ at a receiving end of an optical communication network. An AWG 200 is a passive planar light wave circuit device typically used in optical networks as a wavelength multiplexer and/or demultiplexer. N×N AWGs 200 also have wavelength routing capabilities. If a system has N equally-spaced wavelengths $\lambda_1$ through $\lambda_N$, an N×N AWG 200 can be designed with an egress port spacing matching the wavelength spacing. The N×N AWG 200 routes differing wavelengths at an ingress port 210 to different egress ports 220 such that all N wavelengths are mapped to all N egress ports $220_N$ sequentially. The routing of the same N wavelengths at two consecutive ingress ports 210 have the wavelength mapping shifted by one egress side, which is noted as cyclic. Also, the multiplexing/demultiplexing property repeats over segments of optical spectrum called free spectral ranges. Referring again to FIG. 3A, one AWG 160 may be dedicated to separating signals 32at, 32br transmitted from and received by the transceiver array 32 and another AWG 170 may be dedicated to separating signals 34at, 34br transmitted from and received by the inverse transceiver array 34.

The enhanced remote node 120 may include the same arrangement of components (or a mirror image) as the enhanced diplexer 300, with optional additional components. The enhanced remote node 120 may include first, second, and third multiplexers 130, 140, 150 and first and second circulators 180, 190. The third multiplexer 150 demultiplexes a bidirectional multiplexed signal 312ab into first and second bi-directional signals 152, 154, each signal is in a different optical spectrum. The first signal 152 is in optical spectrum A and the second signal 154 is in optical spectrum B. The enhanced remote node 120 doubles the number of optical fan-outs using the directional properties of optical circulators. The first circulator 180 circulates signals in the first optical spectrum A, while the second circulator 190 circulates signals in the second spectrum B of the optical signal. Therefore, each circulator 180, 190 is dedicated to a specific spectrum A, B. In some examples, the first circulator 180 receives a fourth signal 142at from the second multiplexer 140. The fourth signal 142at is in the first optical spectrum A. The first circulator 180 circulates the fourth signal 142at and directs it to the third multiplexer 150. The first circulator 180 receives a signal 152 from the third multiplexer 150 and circulates the signal 152 to output at the third port 3 as signal 132ar to a first multiplexer 130. The second circulator 190 receives a third signal 132bt from the second multiplexer at its first port 1 and outputs the signal at its second port 2. The second circulator 190 also receives a signal at its second port 2 and outputs the signal 142br at its third port 3 to the second multiplexer 140. Therefore, the circulators 180, 190 separate the received and transmitted signals in the first spectrum A and spectrum B respectively. The first and second multiplexers 130, 140 multiplex the received signals 132ar, 132bt and 142at, 152ar and output third and fourth bidirectional multiplexed signals 164, 174 respectively to the AWG 160, 170 to separate the signals to each end user 252. The first and second AWGs 160, 170 are identical cyclical AWGs, since both of them operate on the same optical wavelengths, with the exception that the upstream and downstream optical wavelengths are inverted between the two AWGs 160, 170. Additionally, the circulators 180, 190 may be separately optimized for spectrum A and spectrum B, respectively.

Figure 3D:
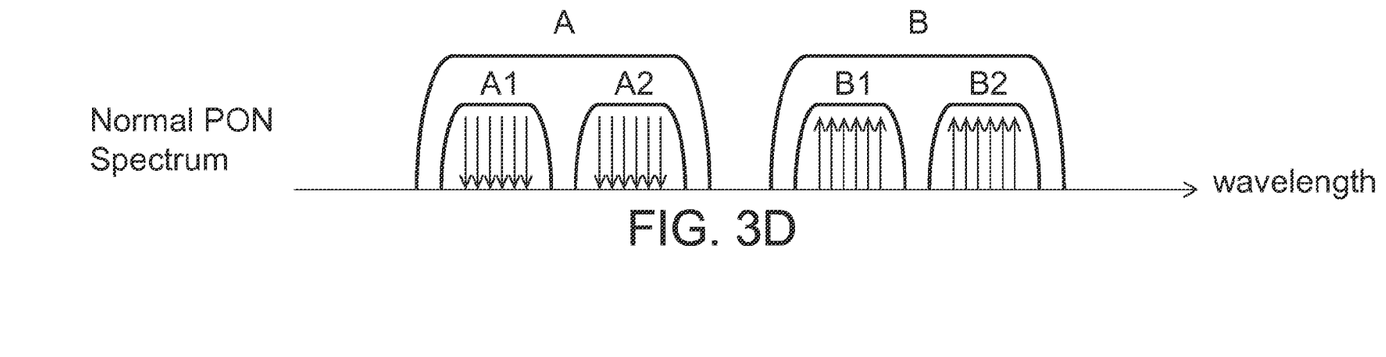
FIGS. 3D and 3E are schematic views of the sub-band signals in normal PON spectrums and inverse PON spectrum.
Figure 3E:
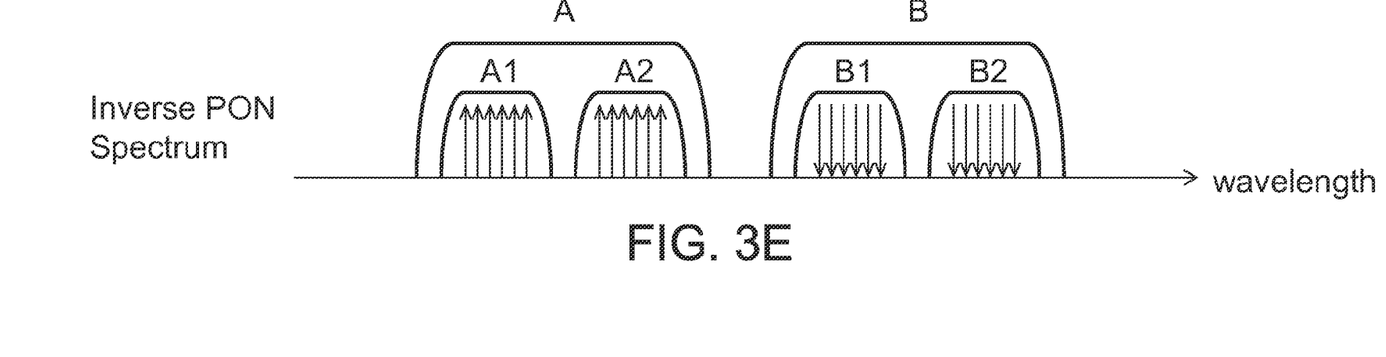

Referring to FIGS. 3D and 3E, in some implementations, the optical spectrum may be further divided into smaller sub-bands to use smaller WDM TRX arrays. Some advantages of using sub-bands include that when the take rate is low, an expensive array transceiver is not necessarily deployed with a high channel count, allowing for pay-as-you-grow system with finer granularity. Additionally, the yield of implementing a smaller size array transceiver may be significantly higher and therefore saving overall cost of the system. FIGS. 3C and 3D illustrate an exemplary spectra of a WDM-PON system with two sub-bands in upstream and downstream directions. In the normal PON, the downstream spectrum A is further segmented into A1 and A2. In some examples, A1 and A2 include a guard band in between to ease the implementations of sub-band multiplexers. Similarly, the upstream spectrum B in the normal PON is further segmented into B1 and B2.

Figure 3F:
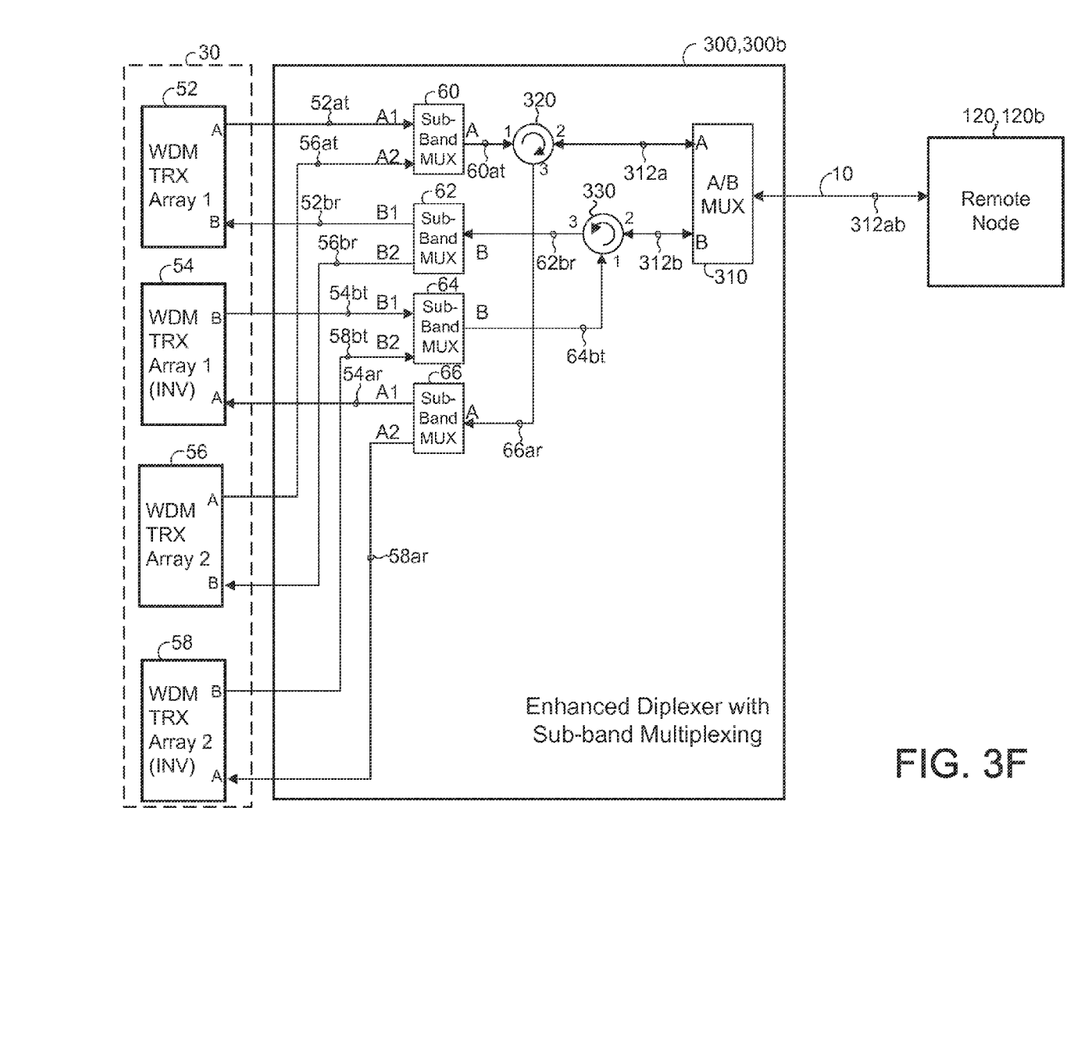
FIG. 3F is a schematic view of a WDM-PON network using an exemplary bi-directional optical communication device.

Referring to FIG. 3F, in some implementations, an enhanced diplexer 300b receives signals from first through fourth transceivers 52-58. The transceivers 52-58 are divided into a first group including the first and third transceivers 52, 56, using a first optical spectrum A for transmitting signals and a second optical spectrum B for receiving signals, and from a second group including second and fourth of transceivers 54, 58 using the first optical spectrum to receive signals and the second optical spectrum to transmit signals. Each transceiver 52-58 includes a sub-band of the respective optical spectrum A, B. The enhanced diplexer 300b includes first, second, third, and fourth sub-band multiplexers 60-66. The first sub-band multiplexer 60 receives two signals, one signal 52at from a first transceiver array 52 and the second signal 56at from the third transceiver array 56. The first sub-band multiplexer 60 multiplexes the received signals 52at, 56at and outputs a first multiplexed signal 60at in the first optical spectrum A. The second sub-band multiplexer 62 receives a third sub-band multiplexed signal 62br and demultiplexes the signal to output a first signal 52br to the first transceiver 52 and a second signal to the third transceiver 56. The third sub-band multiplexer 64 receives a first signal 54bt from the second transceiver 54 and a second signal 58bt from the fourth transceiver 58, both signals in the second optical spectrum B. The third sub-band multiplexer 64 multiplexes the received signals 54bt, 58bt and outputs a second sub-band multiplexed signal 64bt in the second optical spectrum B. The fourth sub-band multiplexer 66 receives a fourth sub-band multiplexed signal 66ar in the first optical spectrum A and demultiplexes the signal into a first output signal 54ar to the second transceiver 54 and a second output signal 58ar to the fourth transceiver 58. The output signals 54ar, 58ar are both in the first optical spectrum A.

Additionally, the enhanced diplexer 300b includes first and second optical circulators 320,330. The optical circulators 320, 330 having a first receiving input port 1, a second bi-directional port 2, and a third output port 3. The first optical circulator 320 receives the sub-band multiplexed signal 60at from the first sub-band multiplexer 60 and routes the sub-band multiplexed signal 60at to a multiplexer 310 as a bi-directional signal 312a. The first bi-directional signal 312a includes the first sub-band multiplexed signal 60at from the first sub-band multiplexer 60 and the fourth sub-band multiplexed signal 66ar, which is rerouted from the multiplexer 310 to the fourth sub-band multiplexer 66. The second optical circulator 330 receives the third sub-band multiplexed signal 64bt and routes the third sub-band multiplexed signal 64bt to the multiplexer 310 as part of a second bi-directional signal 312b. The second bi-directional signal 312b includes the second sub-band multiplexed signal 64bt received from the third sub-band multiplexer 64 and the third sub-band multiplexed signal 62br transmitted to the second sub-band multiplexer 62. The multiplexer 310 multiplexes the signals 312a, 312b and outputs the bidirectional multiplexed signal 312ab via a fiber feeder 10 to an enhanced remote node 120b.

Figure 3G:
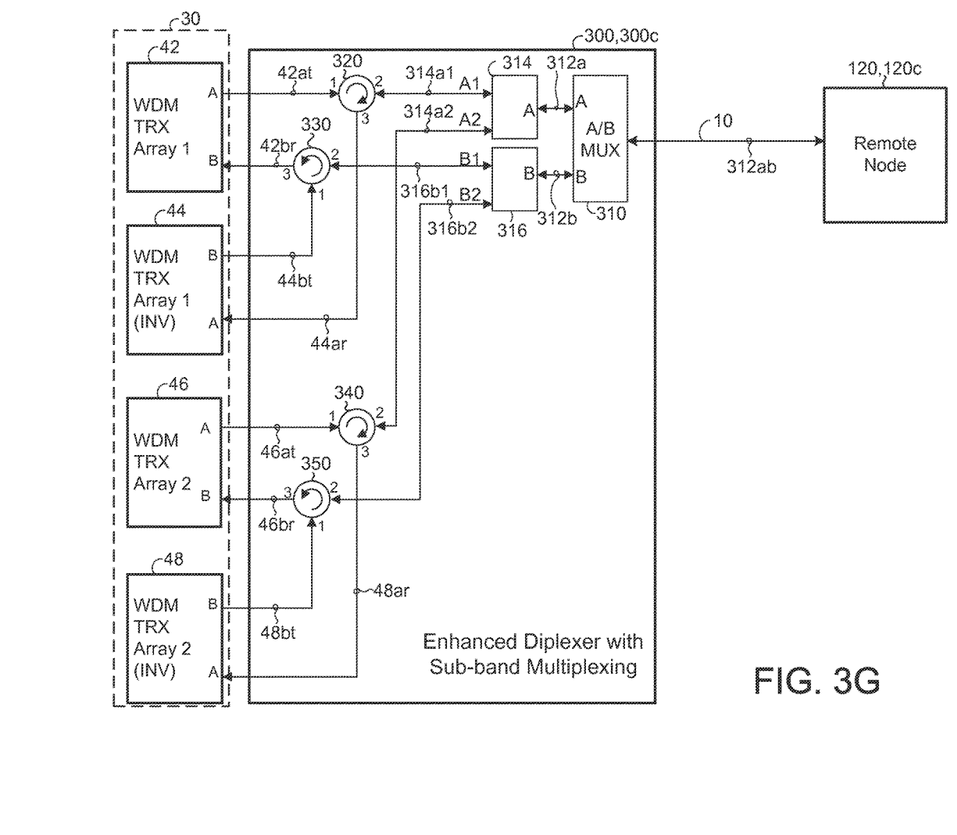
FIG. 3G is a schematic view of a WDM-PON network using an exemplary bi-directional optical communication device.

Referring to FIG. 3G, in some implementations, the enhanced diplexer 300c includes first, second, third, and fourth circulators 320-350. Each circulator has first, second, and third ports 1, 2, 3, where the first port 1 receives a signal and routes the signal to the second port 2, port two in turn receives a signal and routes it to the third port 3. The first circulator 320 receives a signal 42at from a first transceiver array 42 and routes the signal 42at to a first sub-band multiplexer 314. The first circulator 320 receives a second signal 314a1 from the first sub-band multiplexer 314 and routes the signal 314a1 to a first inverse transceiver array 44. The second received signal 314a1 includes downstream signal 42at and upstream signal 44ar, both signals 42at, 44ar in the first optical spectrum A. The second optical circulator 330 receives a first signal 44bt and routes the signal 44bt to a second sub-band multiplexer 316. The second optical circulator receives signal 316b1 which includes upstream signal 42br and downstream signal 44bt, and routes upstream signal 42br to the first transceiver array 42. The third optical circulator 340 receives a first signal 46at from a second transceiver array 46 and routes the signal to the first sub-band multiplexer 314. The third circulator 340 receives signal 314a2 including downstream signal 46at and upstream signal 48br. The circulator routes signal 48br to the second inverse transceiver array 48. The fourth circulator 350 receives a downstream signal 48bt from the second inverse transceiver 48 and routes the signal 48bt to the second sub-band multiplexer 316. The fourth optical circulator 350 receives a signal 316b2 including the upstream signal 46br and downstream signal 48bt. The fourth optical circulator 350 routes the upstream signal 46br to the third arrayed transceiver 46.

In some examples, the first sub-band multiplexer 314 multiplexes the received signals 314a1, 314a2 in the first optical spectrum A, and outputs a bidirectional multiplexed first signal 312a to a multiplexer 310. The second sub-band multiplexer 316 multiplexes the received signals 316b1, 316b2 in the second optical spectrum B, and outputs a bidirectional multiplexed second signal 312b to a multiplexer 310. The multiplexer 310 multiplexes the received sub-band multiplexed signals 312a, 312b and outputs the multiplexed signal 312ab via a fiber feeder 10 to a remote node.

Figure 4:
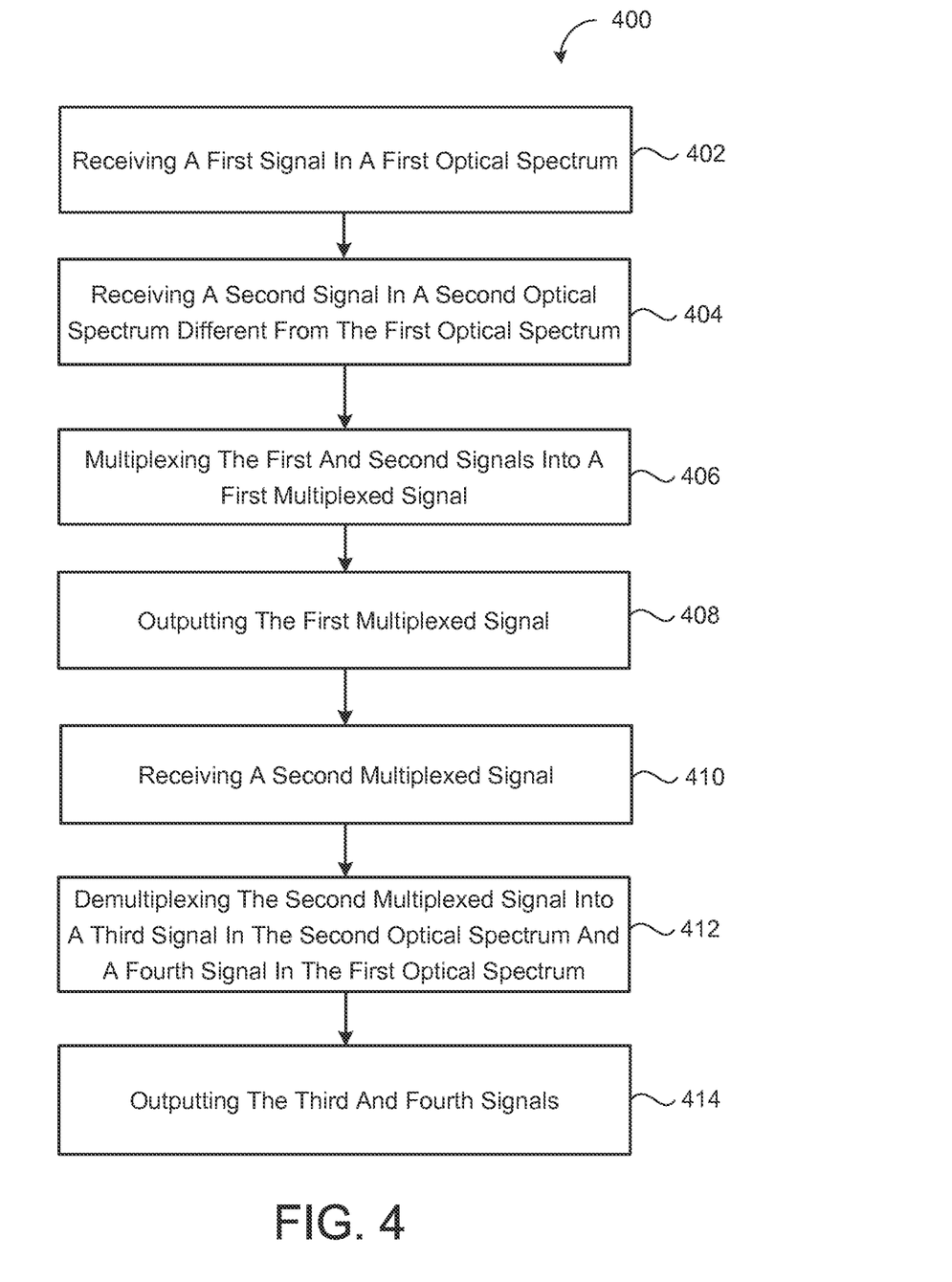
FIG. 4 is a schematic view of an exemplary arrangement of operations for doubling the capacity of a WDM-PON network.

FIG. 4 provides and exemplary arrangement of operations for method 400 of processing optical signals in a passive optical network (PON) 100. The method 400 includes receiving 402 a first signal 32at in a first optical spectrum A (first upstream signal), and receiving 404 a second signal 34bt in a second optical spectrum B (second upstream signal reusing the second optical spectrum). The second optical spectrum B is different from the first optical spectrum A. The method 400 also includes multiplexing 406 the first and second signals 32at, 34bt into a first multiplexed signal 312ab and outputting 408 the first multiplexed signal 312ab. The method 400 also includes receiving 410 a second multiplexed signal 312ab and demultiplexing the second multiplexed signal 312ab into a third signal and a fourth signal 32br, 34ar. The third signal 32br is in the second optical spectrum B (first downstream signal) and the fourth signal 34ar is in the first optical spectrum A (second downstream signal reusing the first optical spectrum). The method 400 also includes outputting the third and fourth signals 32br, 34ar.

In some implementations, the method 400 includes separating the first and fourth signals 312a (32at, 34ar) travelling in opposite directions in the first optical spectrum A, and separating the second and third signals 312b (32br, 34bt) travelling in opposite directions in the second optical spectrum B. Additionally, the method may include routing the first signal 32at and the fourth signal 34ar through a first optical circulator 320, and routing the second signal 32bt and the third signal 34br through a second optical circulator 330. The circulators 320, 330 allow bi-directional use of both spectrums A, B thus doubling the capacity of the PON 100.

In some implementations, the method 400 includes receiving the first signal 32at from a first optical component 32 and outputting the fourth signal 34ar to a second optical component 34, 140. Additionally or alternatively, the method may include receiving the second signal 34bt, 142at from the second optical component 34, 140 and outputting the third signal 32br, 132ar to the first optical component 32, 130. In some examples, at least one of the optical components 32, 34, 130, 140 includes a transceiver 32, 34 or a multiplexer 130, 140.

Referring back to FIG. 3F In some implementations, the method 400 includes receiving the first signal 60at from a first sub-band multiplexer 60 and outputting the third signal 62br to a second sub-band multiplexer 62. The method 400 may also include receiving the second signal 64bt from a third sub-band multiplexer 64, and outputting the fourth signal 66ar to a fourth sub-band multiplexer 66. In some examples, the method 400 includes receiving sub-band signals 52at, 56at of the first signal 60at from a first group of transceivers 52, 56 in communication with the first sub-band multiplexer 60 and outputting sub-band signals 52br, 56br of the third signal 62br to the first group of transceivers 52, 56 through the second sub-band multiplexer 62. Additionally, the method 400 may include receiving sub-band signals 54bt, 58bt of the second signal 64bt from a second group of transceivers 54, 58 in communication with the third sub-band multiplexer 64, outputting sub-band signals 54ar, 58ar of the fourth signal 66ar to the second group of transceivers 54, 58 through the fourth sub-band multiplexer 66. The method 400 may also include routing the first and second bidirectional signals 312a, 312b to a multiplexer 310 for multiplexing the first and second signals 312a, 312b into the first multiplexed bidirectional signal 312ab. In some examples, the method includes routing the second multiplexed 312ab signal to the multiplexer 310 for demultiplexing the second multiplexed signal 312ab into the third 62br and fourth signals 66ar.

Referring back to FIG. 3A, In some implementations, the method 400 includes receiving the first signal 132ar from a first multiplexer 130, the first multiplexer 130 demultiplexing a received third multiplexed signal 164 into the first and third signals 132ar, 132bt. Additionally, the method 400 includes receiving the second signal 142br from a second multiplexer 140, the second multiplexer 140 demultiplexing a received fourth multiplexed signal 174 into the second and fourth signals 142at, 142br. The method may output the third signal 132bt from the first multiplexer 130, and the fourth signal 142at from the second multiplexer 140. The first and second multiplexers 130, 140 may receive the corresponding third and fourth multiplexed 164, 174 signals from corresponding arrayed waveguide gratings 160, 170.

Figure 5:
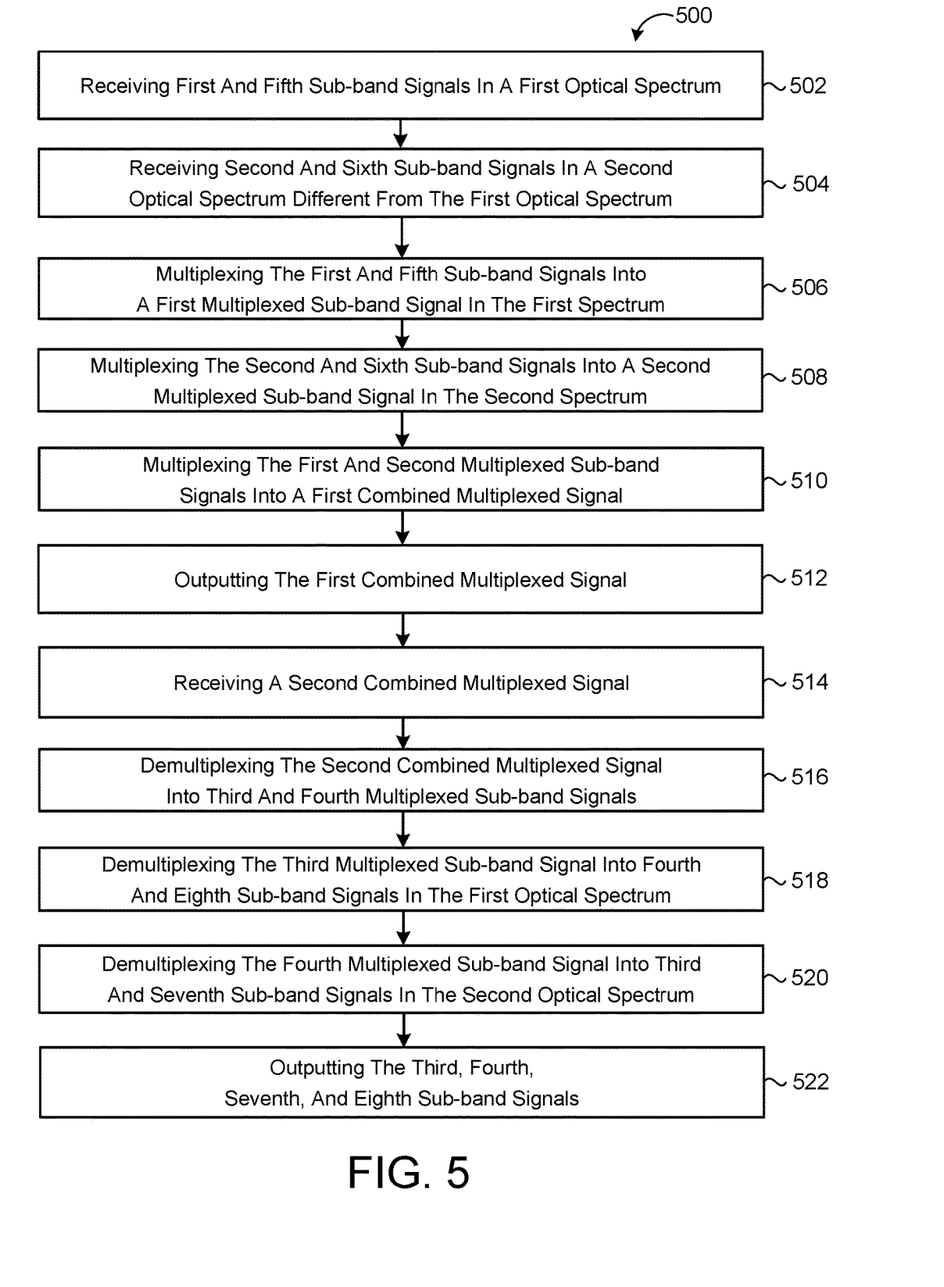
FIG. 5 is a schematic view of an exemplary arrangement of operations for doubling the capacity of a WDM-PON network.

FIG. 5 provides and exemplary arrangement of operations for method 500 of processing optical signals in a passive optical network (PON) 100. The method 500 includes receiving 502 first and fifth sub-band signals 42at, 46at in a first optical spectrum A, and receiving 504 second and sixth sub-band signals 44bt 48bt in a second optical spectrum B. The second optical spectrum B is different from the first optical spectrum A. The method 500 includes multiplexing 506 the first and fifth sub-band signals 42at, 46at into a first multiplexed sub-band signal 312a in the first spectrum A and multiplexing 508 the second and sixth sub-band signals 44bt 48bt into a second multiplexed sub-band signal 312b in the second spectrum B. The method 400 also includes multiplexing 510 the first and second multiplexed sub-band signals 312a, 312b into a first combined multiplexed signal 312ab and outputting 512 the first combined multiplexed signal 312ab. The method 500 also includes receiving a second combined multiplexed signal 312ab and demultiplexing 516 the second combined multiplexed signal 312ab into third and fourth multiplexed sub-band signals 312a, 312b. Additionally, the method 500 includes demultiplexing 514 the third multiplexed sub-band signal 312a into fourth and eighth sub-band signals 44ar, 48ar in the first optical spectrum A and demultiplexing the fourth multiplexed sub-band signal 312b into third and seventh sub-band signals in the second optical spectrum. The method 500 includes outputting the third, fourth, seventh, and eighth sub-band signals 42br, 44ar, 46br, 48ar.

In some implementations, the method 500 further includes separating the first and fourth signals 42at, 44ar travelling in opposite directions in the first optical spectrum A and separating the second and third signals 42br, 44bt travelling in opposite directions in the second optical spectrum B. Additionally, the method 500 may include separating the fifth and eighth signals 46at, 48ar travelling in opposite directions in the first optical spectrum A and separating sixth and seventh signals 46br, 48bt travelling in opposite directions in the second optical spectrum B. In some examples, the method 500 further includes routing the first signal 42at and the fourth signal 44ar through a first optical circulator 320 and routing the second signal 44bt and the third signal 42br through a second optical circulator 330. The method 500 may include routing the fifth signal and the eighth signal 46at, 48ar through a third optical circulator 340 and routing the sixth signal and the seventh signal 48bt, 46br through a fourth optical circulator 350.

The method 500 may include receiving the first signal 42at from a first optical component 42 and outputting the fourth signal 44ar to a second optical component 44. Additionally, the method 500 may include receiving the second signal 44bt from the second optical component 44 and outputting the third signal 42br to the first optical component 42. In some examples, the method 500 includes receiving the fifth signal 46at from a third optical component 46 and outputting the eighth signal 48ar to a fourth optical component 48. The method 500 may also include receiving the sixth signal 48bt from the fourth optical component 48 and outputting the seventh signal 46br to the third optical component 46. The at least one of the optical components may include a transceiver array or a multiplexer.

Whereas two sub-bands in optical spectrum A and optical spectrum B, respectively, have been used as examples in the above descriptions. The method can be generalized to multiple (3 or 4, or more sub-bands) in optical spectrum A and optical spectrum B using similar implementations as described in this disclosure.

A number of implementations have been described. Nevertheless, it will be understood that various modifications may be made without departing from the spirit and scope of the disclosure. Accordingly, other implementations are within the scope of the following claims.

What is claimed is:

1. A method of processing optical signals in a passive optical network, the method comprising:
   receiving first and fifth sub-band signals in a first optical spectrum;
   receiving second and sixth sub-band signals in a second optical spectrum different from the first optical spectrum;
   multiplexing the first and fifth sub-band signals into a first multiplexed sub-band signal in the first spectrum;
   multiplexing the second and sixth sub-band signals into a second multiplexed sub-band signal in the second spectrum;
   multiplexing the first and second multiplexed sub-band signals into a first combined multiplexed signal;
   outputting the first combined multiplexed signal;
   receiving a second combined multiplexed signal;
   demultiplexing the second combined multiplexed signal into third and fourth multiplexed sub-band signals;
   demultiplexing the third multiplexed sub-band signal into fourth and eighth sub-band signals in the first optical spectrum;
   demultiplexing the fourth multiplexed sub-band signal into third and seventh sub-band signals in the second optical spectrum;
   separating the first and fourth sub-band signals travelling in opposite directions in the first optical spectrum by routing the first signal and the fourth signal through a first optical circulator;
   separating the second and third sub-band signals travelling in opposite directions in the second optical spectrum by routing the second signal and the third signal through a second optical circulator;
   separating the fifth and eighth sub-band signals travelling in opposite directions in the first optical spectrum by routing the fifth signal and the eighth signal through a third optical circulator;
   separating the sixth and seventh sub-band signals travelling in opposite directions in the second optical spectrum by routing the sixth signal and the seventh signal through a fourth optical circulator; and
   outputting the third, fourth, seventh, and eighth sub-band signals.

2. The method of claim 1, further comprising receiving the first signal from a first optical component and outputting the fourth signal to a second optical component.

3. The method of claim 2, further comprising receiving the second signal from the second optical component and outputting the third signal to the first optical component.

4. The method of claim 2, further comprising receiving the fifth signal from a third optical component and outputting the eighth signal to a fourth optical component.

5. The method of claim 2, further comprising receiving the sixth signal from the fourth optical component and outputting the seventh signal to the third optical component.

6. The method of claim 2, further comprising wherein at least one of the optical components comprises a transceiver array or a multiplexer.

7. A bidirectional optical communication device comprising:
   a first optical circulator separating first and fourth sub-band signals travelling in opposite directions, the first and fourth sub-band signals being in a first optical spectrum;
   a second optical circulator separating second and third sub-band signals travelling in opposite directions, the second and third sub-band signals being in a second optical spectrum different from the first optical spectrum;
   a third optical circulator separating fifth and eighth sub-band signals travelling in opposite directions, the fifth and eighth sub-band signals being in the first optical spectrum;
   a fourth optical circulator separating sixth and seventh sub-band signals travelling in opposite directions, the sixth and seventh sub-band signals being in the second optical spectrum;
   a first multiplexer in optical communication with the first optical circulator and the third optical circulator, the first multiplexer multiplexing/demultiplexing between a first spectrum multiplexed sub-band signal and the first spectrum sub-band signals;
   a second multiplexer in optical communication with the second optical circulator and the fourth optical circulator, the second multiplexer multiplexing/demultiplexing between a second spectrum multiplexed sub-band signal and the second spectrum sub-band signals; and
   a third multiplexer in optical communication with the first and second multiplexers, the third multiplexer multiplexing/demultiplexing between the multiplexed sub-band signals and a multi-spectrum multiplexed signal.

8. The bidirectional optical communication device of claim 7, wherein the first optical circulator receives the first signal from a first optical component and outputs the fourth signal to a second optical component.

9. The bidirectional optical communication device of claim 8, wherein the second optical circulator receives the second signal from the second optical component and outputs the third signal to the first optical component.

10. The bidirectional optical communication device of claim 9, wherein the third optical circulator receives the fifth signal from a third optical component and outputs the eighth signal to a fourth optical component.

11. The bidirectional optical communication device of claim 10, wherein the fourth optical circulator receives the sixth signal from the fourth optical component and outputs the seventh signal to the third optical component.

12. The bidirectional optical communication device of claim 11, wherein one of the optical components comprises a transceiver array or a multiplexer.

* * * * *